G. D. CARPENTER.
DELIVERY TRUCK.
APPLICATION FILED DEC. 21, 1914.

1,203,977.

Patented Nov. 7, 1916.
2 SHEETS—SHEET 2.

Witnesses.
E. B. Gilchrist
L. I. Porter

Inventor
George D. Carpenter
by Thurston & Kwis
Attorneys

UNITED STATES PATENT OFFICE.

GEORGE D. CARPENTER, OF CLEVELAND, OHIO, ASSIGNOR, BY MESNE ASSIGNMENTS, TO THE WHITE MOTOR COMPANY, OF CLEVELAND, OHIO, A CORPORATION OF OHIO.

DELIVERY-TRUCK.

1,203,977.   Specification of Letters Patent.   Patented Nov. 7, 1916.

Application filed December 21, 1914. Serial No. 878,244.

*To all whom it may concern:*

Be it known that I, GEORGE D. CARPENTER, a citizen of the United States, residing at Cleveland, in the county of Cuyahoga and State of Ohio, have invented a certain new and useful Improvement in Delivery-Trucks, of which the following is a full, clear, and exact description.

This invention relates to improvements in trucks which are especially adapted for use as coal delivery trucks, although, of course, they may be used for any purpose to which they are adapted.

The object is, to provide such a truck with means whereby the load may be discharged by gravity to either side of the truck into a coal hole in the sidewalk, or into any not too high receptacle.

The invention embodied in an auto truck is shown in the acompanying drawings, and is hereinafter described and definitely pointed out in the appended claims.

Figure 1:
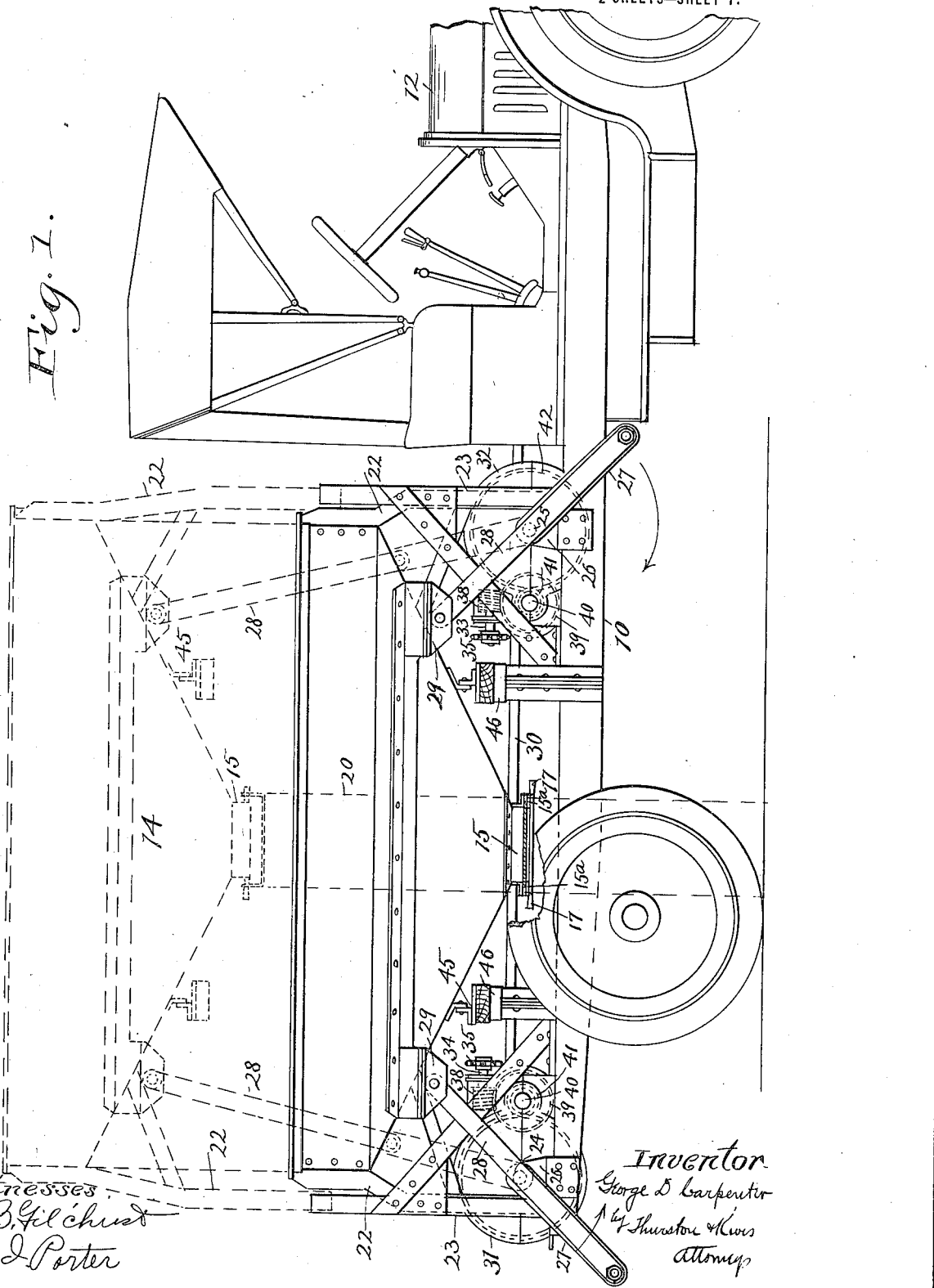
Figure 2:
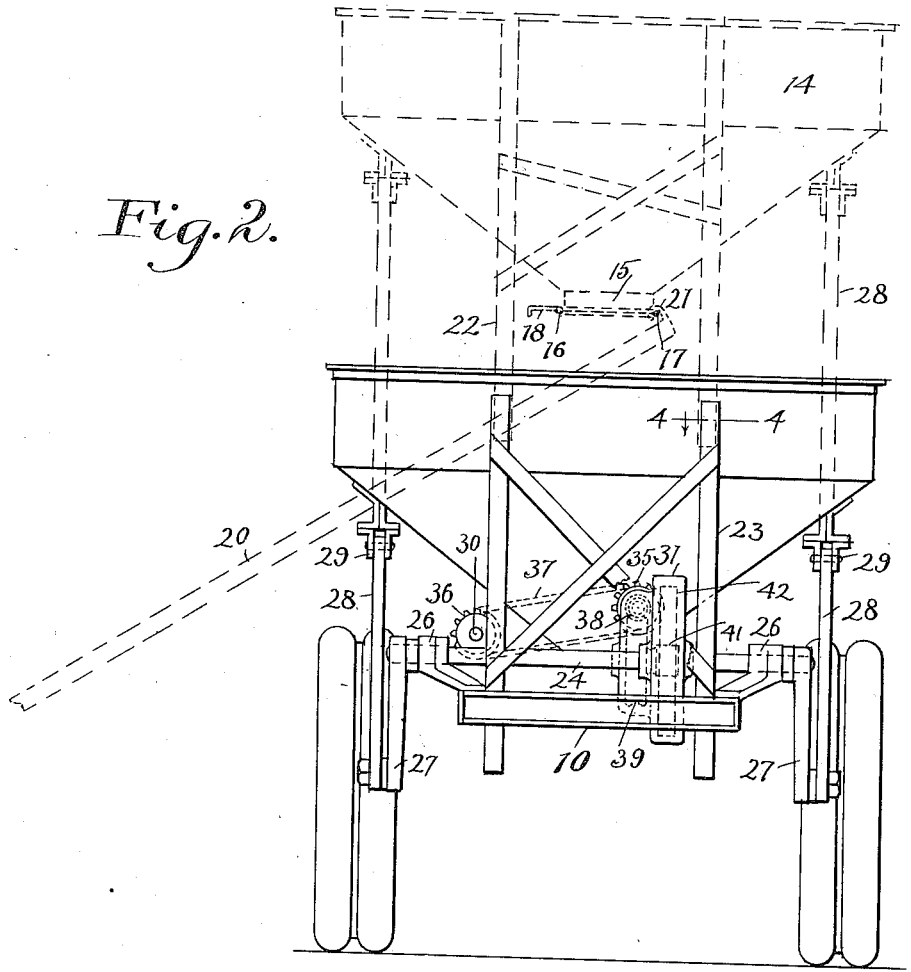
Figure 3:
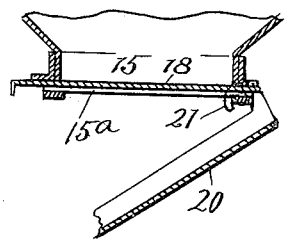
Figure 4:

In the drawing Figure 1 is a side elevation of an auto truck embodying the invention; Fig. 2 is a rear elevation thereof; Fig. 3 is a sectional rear view of the delivery spout of the body; Fig. 4 is a vertical sectional view through one of the guides, on line 4—4 of Fig. 2.

Referring to the parts by reference characters, 10 represents the chassis frame of an auto truck; and it may be assumed that this carries a motor under hood 12, and that it is provided with the usual, or any suitable, driving mechanism.

14 represents the load-carrying body. This is built up of sheet metal, and its bottom is in the form of an inverted truncated four-side pyramid. It is provided with a short centrally placed downwardly extended delivery spout 15. This spout is provided with two pairs of horizontal studs 16, 17, which respectively extend forward and rearward. The purpose of these studs is to afford means by which a delivery chute 20, having hooks 21 at one end, may be suspended from said spout so as to pass beneath the same in either direction, and thence to the desired delivery point. The spout 15 is provided, on its lower end, with guideways 15ᵃ for the horizontal sliding gate 18, which may be moved transversely in either direction to uncover the spout to any desired degree.

The reference character 22 is applied to each of four downwardly extended guide legs connected with the four corners of the body. These may be made of angle iron; and they severally engage with the four guide posts 23 secured to and extending upward from the chassis frame. These guide posts may likewise be made of angle iron.

24, 25 represent two transversely extended shafts which are mounted in suitable bearings 26 carried by the chassis frame. A crank arm 27 is fixed to each end of each of the two shafts. Links 28 are pivotally connected with the ends of these four crank arms and with downwardly extended brackets 29 fixed to the body. Means, which will be presently described, are provided by which the same motor which propels the truck may be caused to simultaneously turn the two shafts 24, 25 in opposite directions, as indicated by the arrows in Fig. 1, and at the same rate. The result will be that the body will be elevated to any desired height, within the capacity of the mechanism, as indicated by dotted lines in Fig. 1. As the body goes up or down, it is sufficiently guided against lateral and endwise displacement by the engagement of its legs 22 in the guide posts 23. There will, however, be very little tendency to endwise displacement, because the two shafts 24 and 25, and their associated mechanisms, will, as the body is being moved up, or down, neutralize each other's tendency to produce such endwise displacement.

When the body has reached the proper elevation the chute 20 is hooked onto two of the studs 16, 17, and extended beneath the delivery spout in either lateral direction therefrom, as described, and to the desired delivery point. When the gate 18 is opened in the proper direction, the load will run out of the spout into and down said chute.

The mechanism employed for turning the two shafts 24, 25, as stated, includes a longitudinally extended power shaft 30 mounted in bearings on the chassis frame. Any known or suitable mechanism may be provided in order that said shaft 30 may be turned in either direction by the same motor which propels the truck. There are two gear cases 31, 32, fixed to the chassis frame beneath the rear and front ends of the body. In these gear cases, the longitudinally extended shafts 33, 34 are respectively mounted. The former extends rearward out of the casing 32, and the latter extends forward out of the casing 31. On the projecting end of each of these shafts a sprocket wheel 35 is fixed. Sprocket wheels 36 are fixed to the shaft 30; and chain belts 37 are provided for transmitting power from the sprocket wheels 36 to the two sprocket wheels 35. Each of the shafts 33 and 34 has within the gear casing a worm 38 which engages a worm gear 39 fixed to a transversly extended shaft 40 which is mounted in the gear casing. A pinion 41 is likewise fixed to this shaft, and this engages a gear 42 which is secured upon the associated shaft 24 or 25. One of the worms 38 should be right handed and the other left handed, wherefore the turning of the shaft 30 will cause the shafts 24 and 25 to be turned in opposite directions, as stated.

When the body is down it will be supported, and the load taken from the crank arms, by the engagement of two transversely extended angle bars 45 fixed to the body, with two transverse beams 46 fixed to the chassis frame. There should be enough resiliency in the bars 45 to allow the two shafts 24, 25 to turn continuously without breaking anything. This is a safety factor, which will insure against injury in case the operator does not stop the power shaft 30 at the right point.

Having thus described my invention, what I claim is:—

1. In a delivery truck the combination of a vehicle frame, a body, two transversely extended shafts mounted on the vehicle frame, crank arms fixed to the ends of said shaft, and links pivotally connected with said crank arms and with said body, and means for simultaneously turning said shafts in opposite directions at the same rate, and four guides fixed to the chassis frame which engage parts fixed to said body.

2. In a delivery truck, the combination of a vehicle frame, a body, two transversely extended shafts mounted on the vehicle frame, crank arms fixed to the ends of said shaft, and links pivotally connected with said crank arms and with said body, a single power shaft, and two trains of gearing intermediate of said power shaft and the said two transverse shafts adapted to turn said transverse shafts in opposite directions.

In testimony whereof I hereunto affix my signature in the presence of two witnesses.

GEORGE D. CARPENTER.

Witnesses:
L. I. PORTER,
A. J. HUDSON.